Patented Dec. 15, 1953

2,662,878

UNITED STATES PATENT OFFICE 2,662,878

POLYMERIZATION CONTROL OF VINYL ACETATE UTILIZING HYDROGEN PEROXIDE

Harold W. Bryant, Kenmore, N. Y., assignor to E. I. du Pont de Nemours and Company, Wilmington, Del., a corporation of Delaware No Drawing. Application July 5, 1951, Serial No. 235,360

4 Claims. (Cl. 260—89.1)

This invention relates to the polymerization of vinyl compounds and more particularly to a method for controlling the polymerization reactions.

The polymerization of many vinyl compounds is accomplished by the employement of acyl peroxides such as benzoyl peroxide or acetyl peroxide as polymerization catalysts. In such polymerization reactions when carried out in non-aqueous reaction mixtures, the reaction rate generally is increased by elevating the temperature and the polymerization reaction generally is exothermic. It is therefore generally necessary to remove heat from the reaction mixture and for the best results to maintain an optimum reaction temperature. In commercial operations, wherein large quantities of material are contained in the reaction vessel, close attention is required to maintain a suitable reaction temperature. Particularly, the reaction rate must not be permitted to become too rapid; otherwise, an excessive amount of heat is developed causing the reaction to proceed still more rapidly with the result that occasionally the reaction may get out of control, developing excessive heat and pressure in the reaction equipment which constitutes a hazard to operating personnel with possible damage to equipment and loss of materials. In such cases, excessive heat and pressure may often develop very rapidly and it is desirable to have some means of substantially instantaneously slowing down or stopping the reaction.

Various polymerization inhibitors are known to the art which if added to the reaction mixture in sufficient amount may slow up or stop the reaction, but the use of such materials is undesirable since the reaction mixture cannot then be utilized for polymerization until it has been carried through a purification process to remove the added inhibitor.

In addition to stopping polymerization reactions which have grown beyond ordinary means of control, it is oftentimes desirable to quickly stop a polymerization reaction which has proceeded to a desired stage. In such cases, it is desirable to stop the reaction very quickly so as to avoid any further polymerization when it has been determined that polymerization has proceeded to the required or desired extent.

One object of the present invention is to provide improved means for controlling polymerization reactions of vinyl compounds. A further object is to provide means for quickly terminating a vinyl resin polymerization reaction. Still other objects will be apparent from the following description of the invention.

The above stated objects may be attained in accordance with the present invention by adding hydrogen peroxide to the reaction mixture in the non-aqueous polymerization of a vinyl compound catalyzed by the presence of an acyl peroxide. It has been found that despite the fact that hydrogen peroxide in some instances is a catalyst for vinyl polymerization, the addition of a relatively small amount of hydrogen peroxide to such reaction mixtures containing an acyl peroxide as polymerization catalyst rapidly, and generally substantially instantaneously, stops the polymerization reaction.

While the addition of the hydrogen peroxide stops the reaction, it is possible in accordance with the present invention to again start the reaction quickly thereafter. This may be accomplished by heating the reaction mixture to cause the decomposition of the hydrogen peroxide therein.

The following examples illustrate the invention.

Example 1

A mixture of 220 cc. of vinyl acetate, 0.9% by weight of methanol and 0.01% by weight of acetyl peroxide was refluxed at atmospheric pressure until polymer formation was evident. 2 cc. of 6% aqueous solution of hydrogen peroxide then was added and a sample of the reaction mixture was withdrawn. After refluxing the reaction mixture for 30 minutes further, a second sample was taken. The amounts of polymer in these samples were 7.42 and 8% by weight, respectively, showing that little or no polymerization occurred after the addition of the hydrogen peroxide.

Example 2

220 cc. of vinyl acetate containing 0.1% acetyl peroxide was heated to reflux. When boiling became vigorous, the heat supply was gradually reduced until the contents continued to boil with no heat input, which occurred about 10 minutes after boiling first started. At this point, when the polymer content of the reaction mixture was 11.1%, 2 cc. of 6% aqueous solution of hydrogen peroxide was added. The boiling stopped immediately. The reaction mixture then was heated for 15 minutes further at reflux temperature. At the end of this time, the reaction mixture was found to contain 12.4% by weight of polymer.

Example 3

Vinyl acetate containing 0.03% by weight of benzoyl peroxide was heated to boiling under reflux for 48 minutes, at which time the polymer concentration was 15.1% by weight. At this point, 0.12% by weight of hydrogen peroxide was added, while refluxing was continued for 42 minutes longer, resulting in a final polymer concentration of 17.7%.

*Example 4*

A continuous vinyl acetate polymerization process was operated in which monomer containing around 10% of methanol was continuously fed into a reaction vessel and a mixture of polymer, monomer and methanol was continuously removed. The reaction vessel was equipped with a reflux condenser, cooling jacket and stirrer; and the latter was continuously operated to stir the reaction mixture so as to maintain substantial homogeneity. The polymerization catalyst, which comprised acetyl peroxide, was fed to the reactor at a rate calculated to maintain the polymerization reaction at a steady reflux rate.

The heat of reaction was removed by the cooling effect of the reflux condensation, by circulating water in the cooling jacket and by heat absorbed by the cold monomer feed. Temperature control was effected by varying the rate of monomer feed and the rate of water circulation in the jacket.

During the course of the reaction, it became necessary to increase monomer feed to prevent excessive temperature rise, and it soon became apparent that sufficient monomer feed to control the temperature would exceed the capacity of the reaction vessel. At this point (the reaction vessel contents being about 400 parts by volume, of which about 25% was polymer in solution) 3 parts by volume of a 5–8% aqueous hydrogen peroxide solution was added, which resulted in instant cessation of the reaction.

The monomer feed and product outflow then were stopped, about a third of the reaction mixture was removed and the remainder was heated to reflux for 4 hours to decompose the hydrogen peroxide, during which time no polymerization occurred. A small amount of catalyst was then added and refluxing continued a further 3 hours, during which time a small amount of polymerization occurred. On the addition of a further batch of catalyst, polymerization commenced at a reasonable rate. Cooling then was applied to the jacket and monomer feed resumed, effecting normal operation.

In a previous operation of the same process, in which excessive heat development occurred and the remedy of hydrogen peroxide addition was not utilized, the pressure developed with explosive violence, rupturing the reaction vessel.

My invention is restricted to polymerization of vinyl compounds in the presence of acyl peroxides as polymerization catalysts in liquid phase systems containing not more than about 10% of water. Such systems contain the vinyl compound monomer and polymerization catalyst, with or without a non-aqueous solvent for the monomer, polymer or both and generally are anhydrous. They are distinguished from aqueous polymerization systems in which the monomer is emulsified or dispersed in water.

While the above examples illustrating the invention relate to polymerization of vinyl acetate, the invention is not restricted thereto, but may be employed in the liquid phase polymerization of monovinyl compounds generally and in the copolymerization of monovinyl compounds with other polymerizable compounds, where an acyl peroxide is used as catalyst. Examples of such vinyl compounds are: the vinyl carboxylates such as the formate, acetate propionate, butyrate, oleate, and stearate; vinyl aromatic hydrocarbons such as styrene, and vinyl naphthalene; and vinyl halides such as vinyl chloride and vinyl bromide.

The acyl peroxides suitable for polymerizing such monovinyl compounds are well known. Generally acetyl and benzoyl peroxides are used. Any acyl peroxides soluble in the monomer or in the reaction solvent are suitable for such polymerizations.

The amount of hydrogen peroxide may vary over a wide range, but generally a concentration of at least 0.02% by weight (calculated as anhydrous $H_2O_2$) is required to effectively stop the reaction.

The minimum required amount for any specific polymerization system may be readily determined by empirical experiments. I prefer to avoid any large excess of hydrogen peroxide over that required to stop the reaction, particularly when the purpose is to stop a reaction that has passed out of control and it is intended to resume polymerization. In most cases I prefer not to exceed a hydrogen peroxide concentration of about 0.2% by weight, although still larger amounts may be used as desired. The limiting value of larger amounts will be apparent to the skilled chemist. For example, it is undesirable to add a quantity sufficiently large to cause undue or destructive oxidation of the components of the reaction mixture.

While I generally prefer to add the hydrogen peroxide as a dilute (e. g., 1 to 10% by weight) aqueous solution, solutions of higher concentration may be employed, if desired, even as high as 70 to 90%. The hydrogen peroxide solutions may be acidic, neutral or alkaline, with due consideration to the requirements for the polymerization system. The degree of acidity or alkalinity has little, if any, effect on the action of the hydrogen peroxide in stopping the polymerization reaction.

The addition of the hydrogen peroxide generally results in destroying the effectiveness of the acyl peroxide as a polymerization catalyst. Hence, if it is desired to resume polymerization after stopping it by hydrogen peroxide addition, first the hydrogen peroxide must be removed and then more of the acyl peroxide catalyst added. The removal of the hydrogen peroxide is easily accomplished by subjecting the polymerization reaction mixture to conditions causing hydrogen peroxide decomposition, e. g., an elevated temperature such as 50 to 120° C. or higher. If desired a catalyst promoting hydrogen peroxide decomposition, such as a heavy metal salt may be added, to accomplish the decomposition in a shorter time or at a lower temperature.

The invention is useful for stopping a vinyl polymerization at any desired stage and particularly for stopping polymerizations that have gotten out of control. In large scale operations, this means for quickly stopping a reaction out of control results in savings in materials and equipment and removes a hazard to personnel.

I claim:

1. In a process for polymerizing vinyl acetate in solution in a non-aqueous solvent containing not more than 10% by weight of water, employing an acyl peroxide as polymerization catalyst, the step comprising adding sufficient hydrogen peroxide to stop the polymerization.

2. In a process for polymerizing vinyl acetate in solution in a non-aqueous solvent containing not more than 10% by weight of water, employing an acyl peroxide as polymerization catalyst, the step comprising adding 0.05 to 0.2% by weight hydrogen peroxide to stop the polymerization.

3. In a process for polymerizing vinyl acetate in solution in a non-aqueous solvent containing not more than 10% by weight of water, employing acetyl peroxide as polymerization catalyst, the step comprising adding 0.05 to 0.2% by weight hydrogen peroxide to stop the polymerization.

4. In a process for polymerizing vinyl acetate in solution in a non-aqueous solvent containing not more than 10% by weight of water, employing benzoyl peroxide as polymerization catalyst, the step comprising adding 0.05 to 0.2% by weight hydrogen peroxide to stop the polymerization.

HAROLD W. BRYANT.

References Cited in the file of this patent

UNITED STATES PATENTS

| Number | Name | Date |
| --- | --- | --- |
| 1,586,803 | Herrmann et al. | June 1, 1926 |
| 2,497,828 | Young | Feb. 14, 1950 |

OTHER REFERENCES

Marvel et al., J. of Polym. Scie., vol. 3, 1948, pp. 350 to 353.